Jan. 20, 1959  R. G. RIDEOUT  2,869,260
APPARATUS FOR PHOTOGRAPHIC SLIDE VIEWING
Filed July 18, 1956  4 Sheets-Sheet 1

INVENTOR.
Richard G. Rideout
BY
Thomas H. Hamilton
ATTORNEY

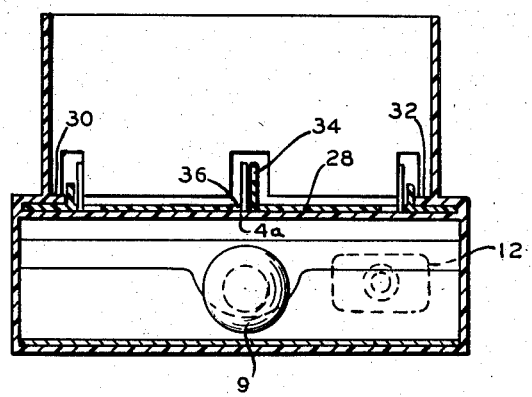
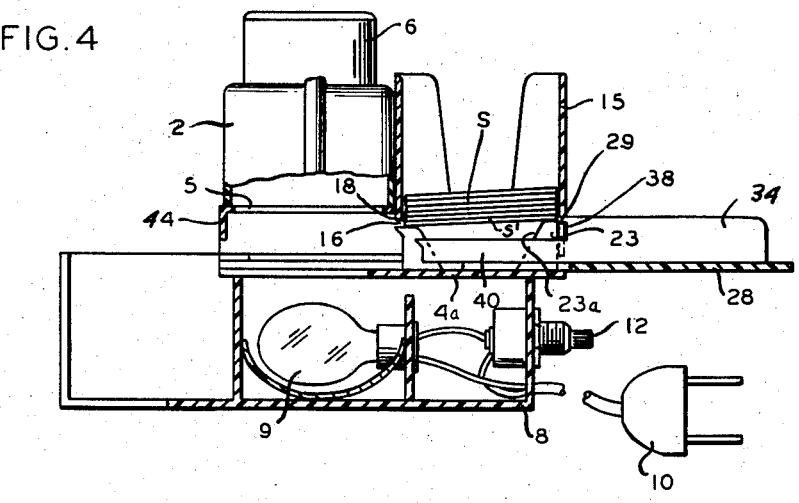
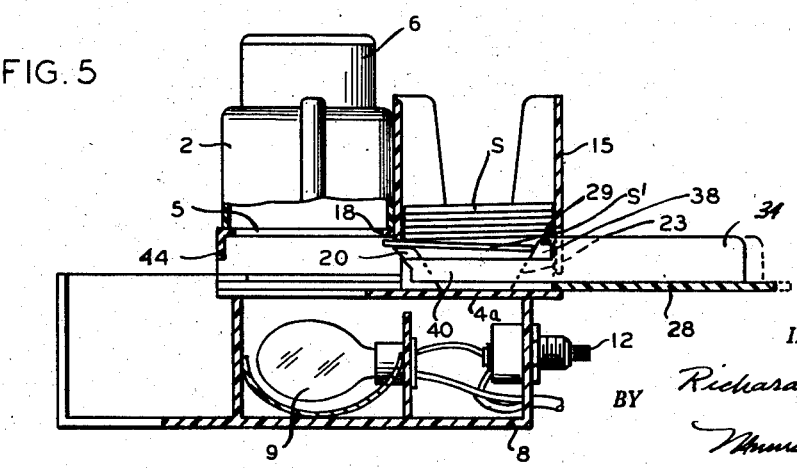

INVENTOR.
Richard G. Rideout
BY
Thomas N. Hamilton
ATTORNEY

Jan. 20, 1959 R. G. RIDEOUT 2,869,260
APPARATUS FOR PHOTOGRAPHIC SLIDE VIEWING
Filed July 18, 1956 4 Sheets-Sheet 4

INVENTOR.
Richard G. Rideout
BY
Munroe H. Hamilton
ATTORNEY

United States Patent Office 2,869,260
Patented Jan. 20, 1959

2,869,260

APPARATUS FOR PHOTOGRAPHIC SLIDE VIEWING

Richard G. Rideout, Cambridge, Mass.

Application July 18, 1956, Serial No. 598,635

7 Claims. (Cl. 40—78)

This invention relates to apparatus for photographic slide viewing of the class in which a stack of photographic slides, such as "Kodachrome Transparencies," are supported in a position whereby successive slides may be moved away from the bottom of the stack into and out of register with an optical viewer by means of a manually operated slide carrier.

A very considerable number of slide viewer structures have already been proposed in the art to accomplish this general purpose, all of which, however, so far as I am aware, have a common difficulty. This difficulty is, essentially, inability to deal efficiently with changes in shape of the soft cardboard frames in which the transparencies are conventionally mounted. It will be appreciated that such frames, as they are handled, tend to become bent out of shape, as well as having their edges roughened, and this interferes with sliding movement of one slide on another, as well as registration of the slides with guideway means of various types. In addition, initial movement of the slides is usually desired to be accomplished by a gravity feed to avoid use of relatively more expensive mechanical feeding parts, and irregularities in a cardboard frame portion will, in a great many cases, interfere with gravity feed and cause jamming, especially if the viewer is held in a tipped position. Failure, for these reasons, to deal positively with faulty slide edges in a cheaply organized slide handling device capable of use in a range of positions has, to a very considerable extent, prevented commercially successful exploitation of the slide viewer field.

The present invention is concerned with the difficulties outlined above in connection with combining with a gravity induced slide feed a manually operable slide carrier arrangement which can be relied upon to transfer slides from a stack regardless of the shape and condition of the edges of such slides without jamming and without limitation as to the speed of hand manipulation or the position in which the viewer is held as the slides are transferred.

From a study of the various complicating factors present in attempting to handle the soft deformable cardboard frames, in the course of which a considerable number of slide handling structures were built and tested, I have conceived of a novel series of slide locating and transfer steps by which successive slides may be caused to move so that neither edge formation nor edge roughening will have any opportunity to cause jamming.

Essentially, the novel series of slide handling steps of the invention comprises, first, causing a bottom slide in a stack to be supported at three points only. Thus, along its front edge, the slide is supported from below at two spaced-apart points so that, regardless of its straightness, the front edge will rest on these points and can move without interference for a short distance. At its rear edge, the bottom slide is supported at a single point only to provide a forwardly tilted position of the slide and the arrangement of parts is so chosen that engagement of this rear edge at a single point only may be realized regardless of how badly bent or deformed the edge may be.

Secondly, in my novel sequence of steps, I provide for advancing the bottom slide and simultaneously shifting this slide, supported as described above, from a forwardly tilted position into a rearwardly tilted position. In the forwardly tilted position, the forward edge of this bottom slide can be very positively guided into a slide guideway aperture and, immediately upon this initial entering of the front edge, this slide is caused to fall into a rearwardly tilted position so that it drops out of contact, throughout most of its area, with that slide occurring immediately above it in the stack whereby no interference between edges can take place. Thereafter, the slide thus moved is advanced into register with an optical viewing apparatus and thereafter, at some desired point, ejected into a hopper as desired by means of the next succeeding slide to be viewed.

In carrying out these novel slide handling operations, I have further devised a novel combination of slide carrier parts which includes a unique slide carrier base having a central pusher bar and a three-point lug support arrangement which cooperates with the pusher bar and a stack of slides in order to carry out the operation of shifting a bottom slide in the stack from a forwardly tilted position to a rearwardly tilted position as it advances into a viewing position.

These and other objects and novel features and structures will be more fully understood and appreciated from the following description of a preferred embodiment of the invention selected for purposes of illustration and shown in the accompanying drawings, in which:

Fig. 3 is a cross-section taken on the line 3—3 of Fig. 1;

Fig. 4 is a vertical cross-sectional view taken approximately centrally of the viewer and illustrating particularly the slide receiver loaded with a stack of slides and with the bottom slide of the stack supported at three points in a forwardly tilted position in readiness to start a slide advancing operation;

Fig. 5 is a view similar to Fig. 4 but further illustrating the bottom slide advanced a short distance into a position in which its forward edge has been led through a slide guideway and the rear edge has dropped down into a rearwardly tilted position out of contact with the slide occurring immediately above it in the stack;

Figure 1:
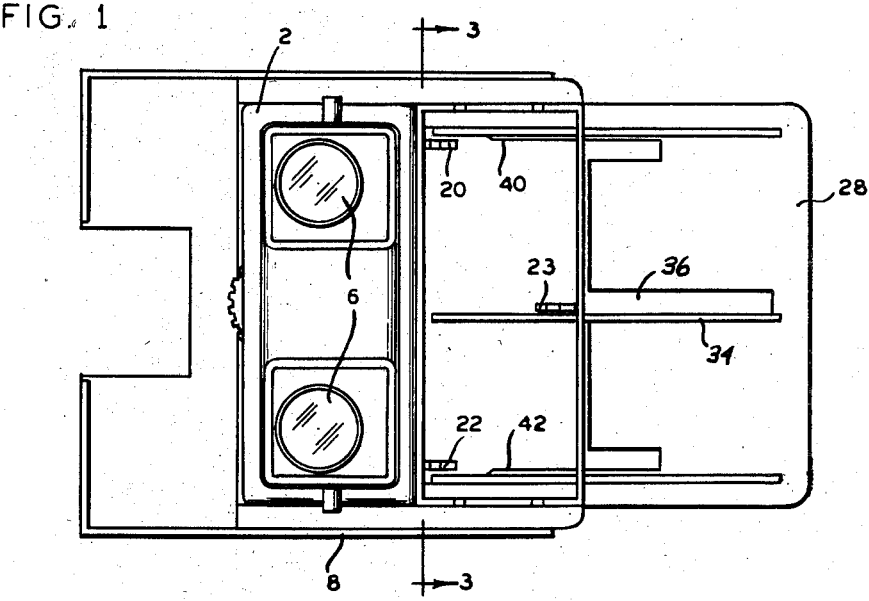
Fig. 1 is a plan view of the slide viewing construction of the invention showing an empty stack receiver and further indicating the special slide carrier member of the invention in the fully extended position assumed by this member in starting a slide advancing operation.
Figure 2:
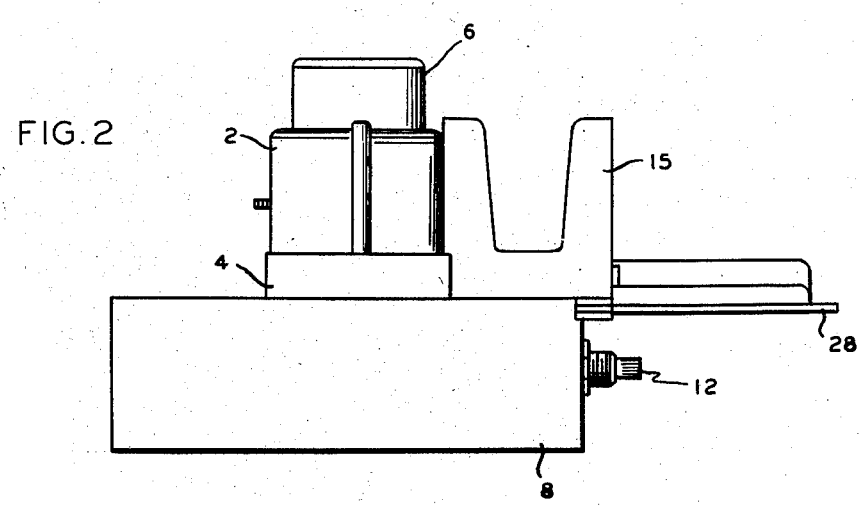
Fig. 2 is a side elevational view of the viewer.

Referring more in detail to the structure illustrated in these figures, numeral 2 denotes an enclosure body (Fig. 1) having a base 4 which is recessed to define a slide aperture 5 (Fig. 4) for registering a slide with the field of view of an optical viewing device 6 of some conventional nature such as a standard stereo-type viewer. The optical viewing device is supported at the upper side of the enclosure body. At the underside of the base 4 is a light housing section 8 in which is contained a lamp 9 and a battery 10 controlled by a switch 12. An opening 14 in the upper wall of the housing section 8 permits light to illuminate a slide when located in the slide aperture 5.

Figure 7:
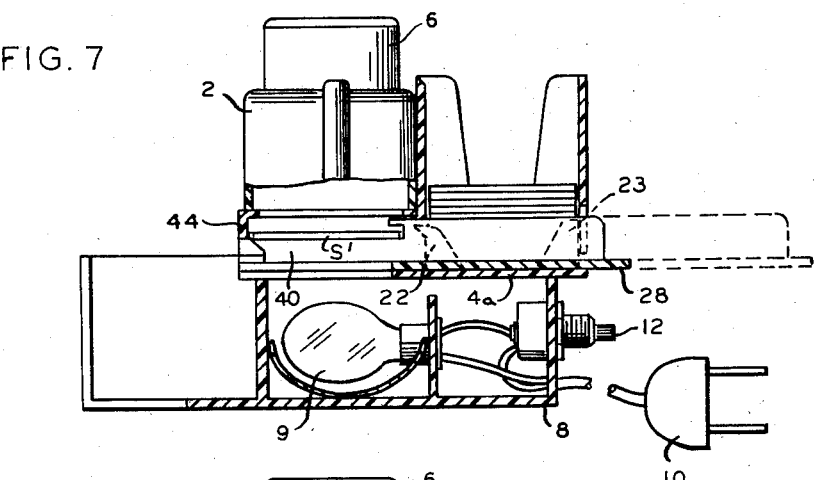
Fig. 7 is another sectional view of the same character noted in Figs. 4, 5 and 6, indicating a transfer of the slide onto supporting arms of the carrier in a viewing position.
Figure 8:
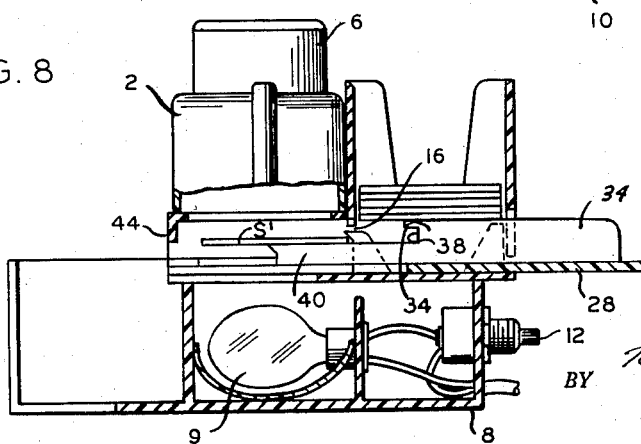
Fig. 8 is a cross-sectional view showing the slide carrier in a partly retracted position which it assumes in starting back to initiate a new feeding cycle.
Figure 9:
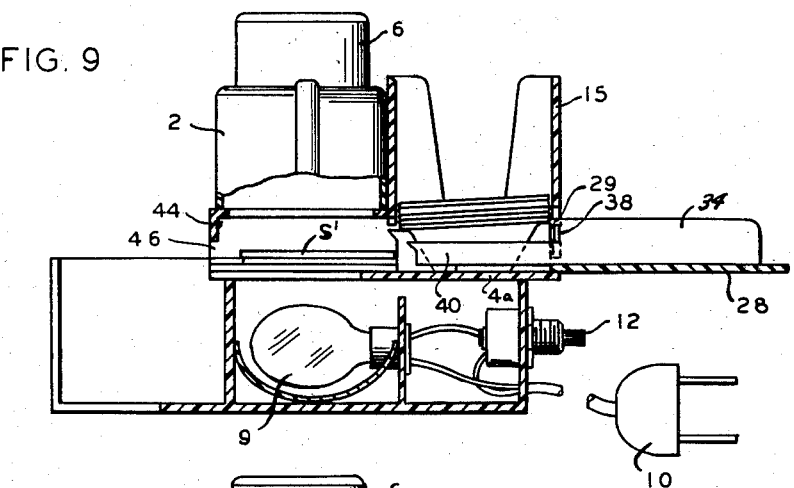
Figs. 9, 10 and 11 are cross-sectional views showing a repetition of slide advancement, as described, and also indicating the manner in which a viewed slide is ejected and passed to a slide collecting hopper.

At the right-hand side of the enclosure body 2 is formed a recess which comprises a slide guideway 16, best shown in Fig. 8. Immediately over the guideway is located a slide receiver 15 which is adapted to receive a stack of slides S, as suggested in Figs. 4–11, inclusive. Adjacent to this recessed side of the enclosure body and immediately below the slide guideway is a base extension 4a which projects outwardly into a position occurring directly below the slide receiver. The receiver is open at its bottom section to permit slides to be fed by gravity downwardly toward the base extension 4a.

I further provide on the base extension 4a a special three-point lug support arrangement for retaining the bottom slide S1 in a position such as that indicated in Fig. 4 in which the forward edge of slide S1 is aligned with the slide guideway 16. This guideway is of a limited size so that only one slide thickness may be accommodated. However, in order to avoid interference which conceivably may arise where a slide has been bent out of shape along its forward edge or where the edge has been roughened in such a way as to increase its thickness appreciably, I employ a pair of narrow spaced-apart projecting fingers, one of which, 18, is shown in Figs. 4 and 5. These narrow fingers limit the width of the guideway at two points and, yet, are effective to permit passage of warped front edges or front edges of varying thickness. At the same time, the fingers as 18 are of a length chosen to positively retard forward movement of all other slides in the stack S above the slide S1.

The special three-point lug support arrangement of the invention includes a pair of spaced-apart front lugs 20 and 22 (Fig. 1) and a rear lug 23, all of which are stationary, being solidly mounted on the extension 4a of the base 4 in a manner suggested in Figs. 1 and 3–8, inclusive. A feature of this three-point lug arrangement is that almost any type of irregular or bent slide will be accommodated in the same manner as an unchanged slide, since the two front lugs support a front edge of the slide S' along its front edge at the underside thereof. It will be obvious, therefore, that regardless of warping or curling the forward edge will necessarily be supported at two points in a suitable position to pass through the guideway 16. At the same time, I provide the rear lug 23 of a height slightly greater than the height of the two front lugs and I locate the rear lug in a central position intermediate the two front lugs.

By means of the arrangement of lugs thus described, the rear edge of the slide S' is supported from below at one point only and the slide must assume a forwardly tilted position which positively insures that the forward edge of slide S' will pass through the guideway without the possibility of the edge jamming or sticking at any point along the guideway.

To cooperate with the special lug support arrangement described, I further construct a novel slide carrier which is slidably supported on the base extension 4a and which is shown in a fully retracted position in Fig. 1–4, and also shown in various stages of advancement in Figs. 5–11, inclusive. This novel slide carrier member comprises a bottom section 28, opposite edges of which are retained in some suitable manner as by channel portions 30 and 32 (Fig. 3) in the base extension 4a.

Fixed centrally of the bottom section 28 is a vertically projecting slide pusher member 34 which is of a height adapted to engage against a rear edge of bottom slide S1 and advance the slide S1 forwardly and away from the lug 23. The bottom section 28 is slotted at 36 to provide for movement of the slide carrier by the lug 23 and, similarly, a clearance is provided to facilitate movement of the carrier past the two front lugs 20 and 22.

The pusher member 34 is constructed with an engaging head 29 which is of a size chosen to just engage with the rear edge of slide S1, as suggested in Fig. 4. Also, along its lower front edge, the pusher bar 34 is recessed to provide a notched surface 38. With this arrangement, it will be observed that, as the engaging head 29 forces the slide S1 forwardly, the rear edge of this slide will drop down onto an inclined surface 23a of the lug 23 so that, throughout most of its area, the slide S1 is no longer in contact with that slide occurring immediately above it in the stack S and, therefore, there is no chance for a roughened edge of one slide to stick to a roughened edge of the other. It will also be noted that, as the slide S1 drops into the position described, its forward edge has entered the guideway 16 and as the slide is advanced its rear edge drops down into a rearwardly tilted position and at a level such that the engaging head 29 may pass over this rear edge and positively engage it with the notched surface 38.

Figure 6:
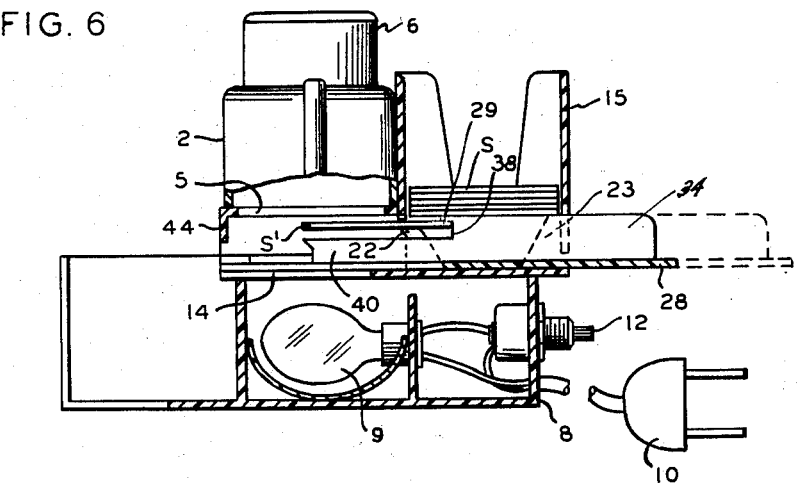
Fig. 6 is a view similar to Figs. 4 and 5 showing a further step in advancing the slide in which the latter member has moved away from its rear supporting lug and is engaged by a slide pusher bar.

Figs. 4 and 5 illustrate the starting position and the first advancement of the slide through a short distance. Figs. 6 and 7 show the slide S1 moved partway into the enclosure body, in which position the notched surface 38 and the engaging head 29 co-operate with the guideway forming parts 18, 20 and 22 of the enclosure body to hold the slide S' in a substantially horizontally disposed position with both lugs 20 and 22 supporting the slide S1 at its underside.

Further movement of the slide S1 into the position shown in Fig. 7 results in the rear edge of the slide S1 being forced over the lugs 20 and 22 and thereafter dropping down upon a pair of arms 40 and 42. These arms extend forwardly from the pusher bar member, being solidly fixed along two opposite edges of the slide carrier bottom section 28, as noted in Fig. 1.

With the slide S1 supported on the arms 40 and 42, further forward movement of the slide carrier forces the slide S1 against a stop bar 44 and the slide may thus be held stationary directly below the viewing aperture in the field of view of the optical viewing means 6 while being illuminated by radiation from the lamp 9.

In repeating the cycle of steps described in order to place a new slide in a viewing position, the slide carrier is moved rearwardly or in a direction from left to right, as viewed in Fig. 8 and, as a result of this movement of the slide carrier, the slide S1 is pulled backwardly for a short distance until its rear edge abuts against the inclined surfaces of the lugs 20 and 22, as suggested in Fig. 8. Further movement of the slide carrier completely disengages the arms 40 and 42 from the slide S1 and the latter member then drops down into the bottom of the base section 4 below the stop bar 44 and into a position of alignment wtih a slide ejecting passageway 46 formed in the enclosure body just below the stop bar 44.

Figure 10:
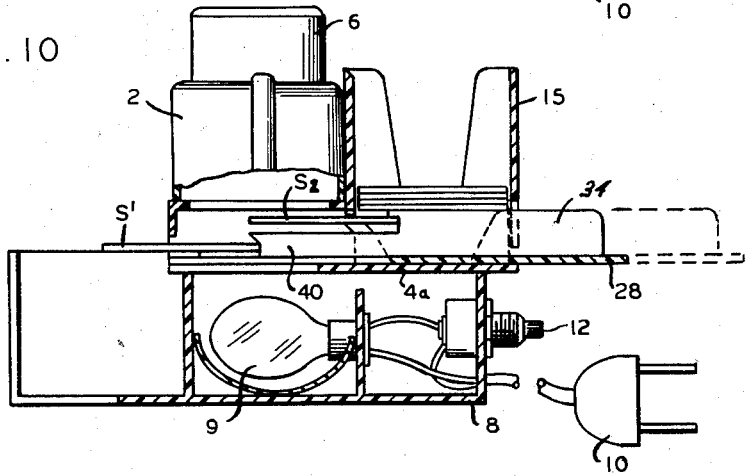
Figure 11:
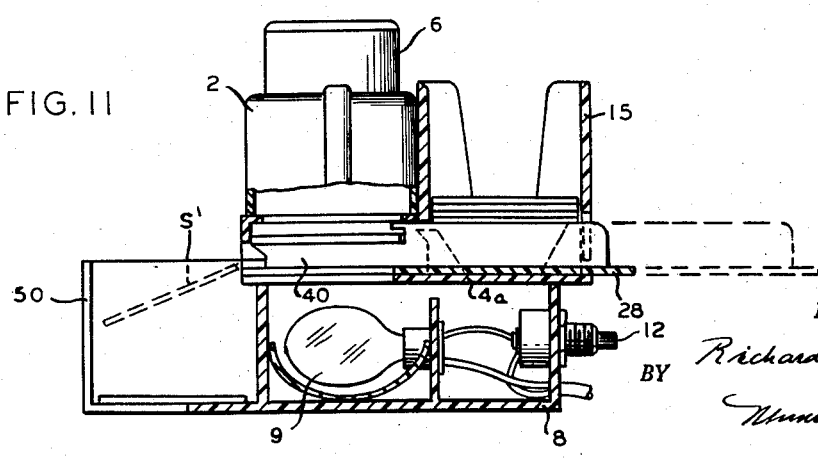

The slide carrier, having been fully retracted, is then advanced in the manner already described with a slide S2 being carried forwardly and simultaneously the slide S1 is forced through the passageway 46, as suggested in Fig. 10, and drops down into a slide hopper 50, as shown in Fig. 11.

It is pointed out that the series of movements are so organized that interference at any point along the path of travel of a slide is substantially eliminated. Moreover, the simplicity and cheapness of gravity feeding is preserved and yet, the slide carrier may be rapidly reciprocated without loss of positive guiding and control. Finally it should be observed that the relationship of supporting and moving parts is chosen such that the entire viewing apparatus may be tipped or held in any desired position without danger of jamming a slide in any of its positions of advancement.

While I have described and illustrated a preferred embodiment of the invention, it will be understood that

Having thus described my invention, what I claim is:

1. A photographic slide viewer comprising an enclosure body having a base recessed at one side to define a slide guideway, optical viewing means mounted at the upper side of the enclosure body, a slide aperture for registering a slide with the field of view of the optical viewing means, a light source mounted in the base of the enclosure body to illuminate the slide, slide receiver means for locating a vertical stack of photographic slides at one side of the enclosure body immediately above the said slide guideway, a reciprocating slide carrier slidably supported at the underside of the slide receiver for movement into and out of the said guideway, stationary lug means mounted on said enclosure base for supporting a bottom slide in the said stack in a forwardly tilted position and pusher bar means located centrally of the carrier for advancing a bottom slide and simultaneously positioning the slide in a rearwardly tilted position in which it is caused to pass through the guideway into register with the slide aperture and optical viewing means.

2. A structure as defined in claim 1 in which the lug means on said base includes two spaced-apart lug elements constructed and arranged to support the said bottom slide in the stack along its front edge at the underside thereof, and a third lug element arranged to support the bottom slide at a point centrally of its rear edge at the underside thereof.

3. A structure as defined in claim 2 in which the said third lug is of a height greater than that of the said two front lugs whereby the bottom slide is normally supported in a forwardly tilted position adapted to facilitate entry of the front edge of the slide into the guideway.

4. A structure as defined in claim 3 in which the said third lug element is formed with an inclined front edge portion for causing the rear edge of a bottom slide to drop into a rearwardly tilted position out of contact with the slide occurring immediately above it in the stack when displaced by forward movement of the pusher bar means.

5. A structure according to claim 4 in which the pusher bar is recessed to form a slide engaging notch which cooperates with the said two front lug elements to hold a slide in a substantially horizontally disposed position as the slides moves through the slide guideway.

6. A structure according to claim 5 in which the slide carrier is provided with a pair of spaced-apart slide supporting arms lying on opposite sides of the pusher bar and projecting forwardly therefrom so as to receive a slide as it passes away from the said two front lug elements, and a stop bar formed integrally of the enclosure body and cooperating with the slide supporting arm to hold a slide in a correctly registered position in the slide aperture.

7. A structure according to claim 6 in which the enclosure body is recessed at points below the stop bar to form a slide ejecting passageway through which a viewed slide may be moved when disengaged from the slide supporting arms in a retracted position of the slide carrier.

References Cited in the file of this patent

UNITED STATES PATENTS

| | | |
|---|---|---|
| 1,752,952 | Jelinek | Apr. 1, 1930 |
| 2,239,032 | Boch | Apr. 22, 1941 |
| 2,533,441 | Estes | Dec. 12, 1950 |